US006038088A

United States Patent [19]

Ikegame

[11] Patent Number: 6,038,088

[45] Date of Patent: Mar. 14, 2000

[54] OPTICAL ELEMENT SUPPORTING APPARATUS USING DAMPING MATERIAL

[75] Inventor: Tetsuo Ikegame, Hachioji, Japan

[73] Assignee: Olympus Optical Co., Ltd., Tokyo, Japan

[21] Appl. No.: 09/236,507

[22] Filed: Jan. 25, 1999

[30] Foreign Application Priority Data

Jan. 27, 1998 [JP] Japan .................................. 10-013969

[51] Int. Cl.[7] ............................. G02B 7/02; H04B 10/20; G11B 7/00

[52] U.S. Cl. .......................... 359/823; 359/824; 359/813; 359/199; 369/44.14; 369/44.15; 369/44.16

[58] Field of Search .................................... 359/199, 213, 359/224, 822, 823, 824, 813, 814; 369/44.14, 44.15, 44.16, 44.17

[56] References Cited

U.S. PATENT DOCUMENTS 5,841,593 11/1998 Ikegame et al. ........................ 359/823

FOREIGN PATENT DOCUMENTS 6-314432 11/1994 Japan .

*Primary Examiner*—Georgia Epps
*Assistant Examiner*—Saeed Seyrafi
*Attorney, Agent, or Firm*—Frishauf, Holtz, Goodman, Langer & Chick, P.C.

[57] ABSTRACT

A damping material holding gap is formed between a fixed member and a movable member having an optical element or component. A pair of convex portions or projecting portions are formed on a surface forming the damping material holding gap. A narrow portion having a reduced width is formed between these convex portions or projecting portions. The damping material is held at the narrow portion by surface tension. The damping material is thereby held at a precise position.

11 Claims, 11 Drawing Sheets

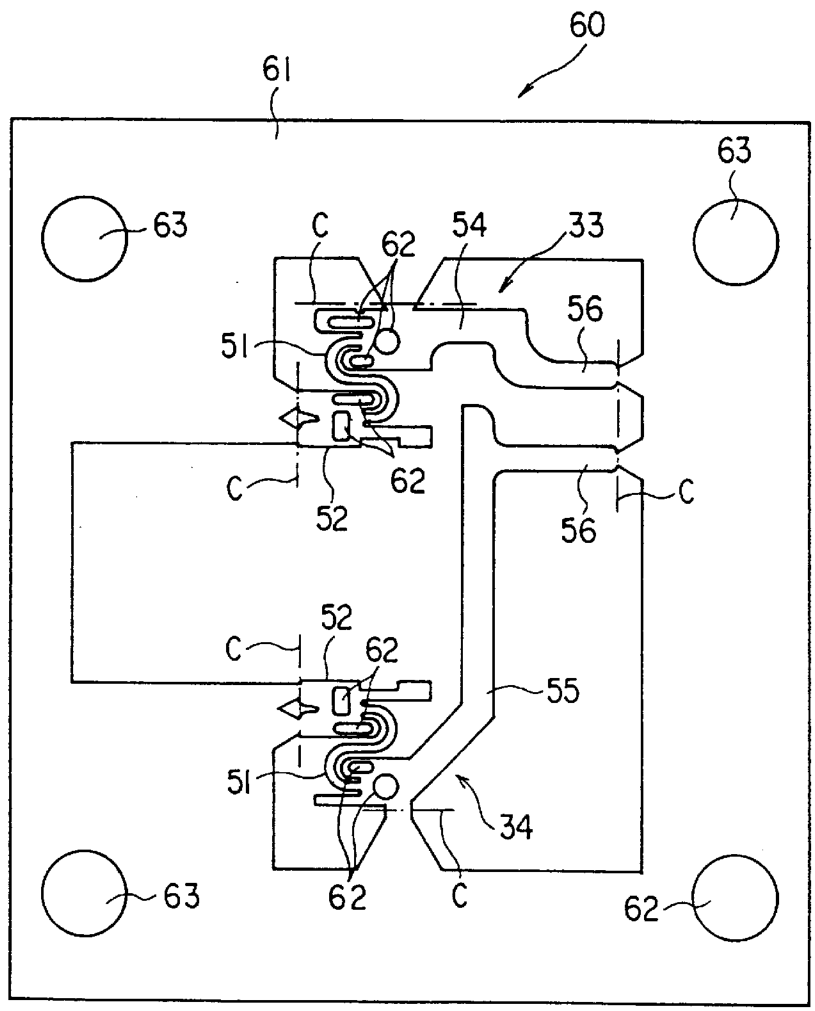
FIG.7
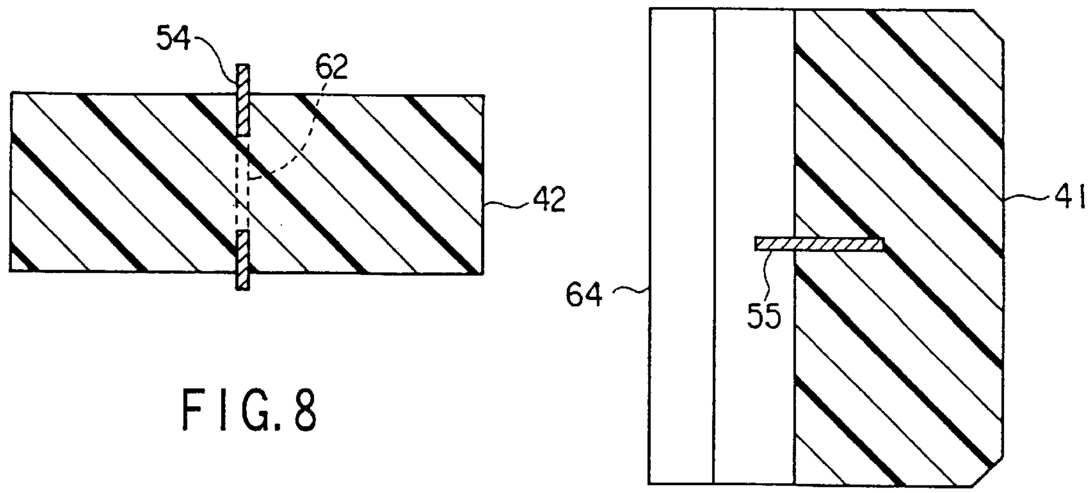
FIG.8
FIG.9

R
31
51b
W2
51a
W1
51c
W3
51
51a
32
51b 31
176
42
71
N1
74
G
72
176
51
G
76
75
76
73
N
176
G
74
N1
176
44

32

OPTICAL ELEMENT SUPPORTING APPARATUS USING DAMPING MATERIAL

BACKGROUND OF THE INVENTION

The present invention relates to a supporting apparatus for an objective lens used in an optical apparatus such as an optical scanner or the like or used in a data recording/reproducing apparatus which records/writes data with respect to an optical recording medium such as an optical disk drive, postscript type disk drive, phase change disk drive, CD-ROM, DVD, optical card, or the like, and also relates to a supporting apparatus for an optical element such as a galvano mirror or the like.

Conventionally, an optical element internally having a movable part or a movably supported optical element is used in various optical devices as described above. For example, in an optical element of an optical element such as a galvano mirror, an optical element such as an internal mirror or the like is supported to be rotatable and another optical element such as a objective lens which enables focus control is supported to be movable in a predetermined direction.

In many cases, a supporting apparatus based on a spring has been conventionally used as an apparatus for movably supporting an optical component or element of a small size. This type of supporting apparatus supports a movable part by a spring, and the movable part is supported to be rotated freely about a predetermined axis or moved freely in a predetermined direction by deformation of the spring. However, in this supporting apparatus based on a spring, when the movable part is rotated or moved, a restoring force is caused due to deformation of the spring, and therefore, there is a drawback that the movable part oscillates at a predetermined oscillation frequency so that resonance may occur when the movable part is driven.

To prevent this drawback, a damping mechanism is provided to apply a damping force to the oscillation of the movable portion. In a small size optical element or the like, a gel damping material is used as the damping mechanism. An example of the gel damping material is disclosed in Japanese Patent Application KOKAI Publication No. 6-314432.

FIGS. 20 to 21C show a basic structure of a damping mechanism using a conventional gel damping material as described above. Specifically, the reference 201 in the figures denotes a member in a fixed side, and a spring 202 made of a wire formed in U-shape is attached to an attachment portion 203 of the fixed side member 201. This spring 202 has a pair of leg portions 202*a* and 202*b* and a movable member (not shown) is supported at the top end portion of the leg portion 202*a*. For example, the movable member is supported to be rotatable or movable by twisting or bending the leg portion 202*a* to be deformed. The other leg portion 202*b* is not deformed.

Further, a gel damping material D is maintained between the leg portion 202*a* and the other leg portion 202*b*, for example. As the damping material D, for example, a thermosetting silicon gel material is used. To maintain the damping material D, a predetermined amount of silicon gel material in form of an unhardened liquid having fluidity is injected between the pair of leg portions 202*a* and 202*b*, and the lump of liquid D is maintained in a gap between the leg portions by the surface tension thereof. Further, thereafter, the entire part is heated by an oven or the like to harden the silicon gel material, forming the silicon gel material D in form of a gel.

Since the pair of leg portions 202*a* and 202*b* are embedded in the silicon gel material D in form of a gel, a damping force is generated due to viscosity of the silicon gel material D when one leg portion 202*a* and the other leg portion 202*b* are shifted relatively to each other by rotation or motion of the movable member.

Meanwhile, in case of maintaining a liquid silicon gel material D as described above between the leg portions, cohesion acts to minimize the free surface due to the surface tension in the liquid lump of the silicon gel material. Accordingly, in a direction perpendicular to the lengthwise directions of the leg portions 202*a* and 202*b*, the liquid lump of the silicon gel material is maintained to be stable in symmetrical positions and forms with respect to the center of the gap between the leg portions. However, in the lengthwise direction of the leg portions, the cross-sectional shapes of the leg portions and the distance therebetween are constant, and therefore, the area of the free surface is constant even if the liquid lump moves in the lengthwise direction. Accordingly, the unhardened silicon gel material injected into the gap can be maintained at an arbitrary position in the lengthwise direction so that the liquid lump unstably maintains its own position.

Therefore, in a conventional apparatus, the liquid lump of the silicon gel material D is positioned in the top end side of the other leg portion 202*b* as shown in FIG. 21A or in the center portion of the leg portion 202*b* as shown in FIG. 21B or shifted to the side of the fixed side member 201 as shown in FIG. 21C and maintained in the gap between the fixed side member 201 and the leg portions 202*a* and 202*b*. Accordingly, the position of the silicon gel material D in form of a gel formed by hardening such an unhardened silicon gel material is not constant. Therefore, variation of the damping characteristic appears in the supporting apparatus for the optical element or component, resulting in a drawback that the control accuracy is lowered. This drawback appears more notably as the size of the optical element or component becomes smaller and the accuracy thereof becomes higher.

BRIEF SUMMARY OF THE INVENTION

The present invention has been made on the basis of the above situation and provides a supporting apparatus for an optical element or component using a damping material such as a gel in form of a liquid lump, in which the damping material can be held precisely at a predetermined position.

To achieve the above object, the supporting apparatus according to the present invention comprises: a fixed side section; a movable side section having at least an optical element or component; a support mechanism for supporting the movable side section such that the movable side section can be displaced with respect to the fixed side section; drive means for displacing the movable side section; and a damping material provided between the fixed side section and the movable side section and having fluidity and viscosity, thereby to apply a damping force against a displacement of the movable side section, wherein the apparatus further comprises a damping material holding gap for holding the damping material, and the damping material holding gap has a narrow portion where the damping material holding gap is partially narrowed in correspondence with a holding position of the damping material.

Accordingly, when an unhardened damping material injected in the damping material holding gap is going to move in the gap, the area of the free surface of the damping material changes at the narrow portion. Therefore, movement of the damping material is restricted by the narrow portion so that the damping material is held at a predetermined position without causing the damping force to vary. A supporting apparatus with high accuracy can thus be provided.

Also, according to a preferred embodiment, the narrow portion is formed at a position corresponding to a center portion of the damping material held at a predetermined position. Therefore, when the damping material moves, a difference appears between the areas of the free surface in both sides of the material, and the damping material is returned to the center of the narrow portion and is held at a predetermined position due to a difference between the surface tensions depending on the difference.

Also, according to a preferred embodiment, the narrow portion is formed at a position corresponding to an end portion of the damping material held at a predetermined position. Therefore, the free surface at the end portion of the damping material is held at the position of the narrow portion by a tendency to minimize constantly the area, and the damping material is thereby held at a predetermined position. Also, according to a preferred embodiment, the narrow portion is formed at each of a plurality of portions. Therefore, the damping material can be held more securely at a predetermined position, and the damping material can be held at any portion of the plurality of narrow portions even if the amount of the damping material is changed.

Also, according to a preferred embodiment, the damping material holding gap is formed between at least two surfaces, one being a surface formed on the fixed side section and another being a surface formed on the movable side section, the support mechanism comprises a spring for supporting the movable side section such that the movable side section can be displaced by elastic deformation, and at least a part of the spring is arranged in the damping material holding gap and is embedded in the damping material held in the damping material holding gap.

Therefore, a damping force is applied between two surfaces which are displaced in relation to each other and also applied to a part of the spring which is displaced by elastic deformation, so that a more secured damping force can be applied.

Also, according to a preferred embodiment, the damping material holding gap is formed between at least two surfaces formed on the fixed side section and at least two surfaces formed on the movable side section, the support mechanism comprises a spring for supporting the movable side section such that the movable side section can be displaced by elastic deformation, and at least a part of the spring is arranged in the damping material holding gap and is embedded in the damping material held in the damping material holding gap.

Therefore, a damping force can be applied to a part of a spring which is displaced due to elastic deformation by the damping material. In addition, the damping material holding gap is formed at the fixed side section or the movable side section, and therefore, this gap can be formed in a concave shape having a rear wall, so that the damping material can be held more securely at a predetermined position.

Also, according to a preferred embodiment, the support mechanism comprises a spring for supporting the movable side section such that the movable side section can be displaced by elastic deformation, and the damping material holding gap is formed at least two portions of the spring which are displaced relatively to each other when the spring is elastically deformed. Therefore, the structure can be more simplified.

Also, according to a preferred embodiment, the damping material holding gap is formed between at least two surfaces, one being a surface of the fixed side section and another being a surface of the movable side section, and the support mechanism is provided outside the damping material holding gap. Therefore, the layout relationship between the support mechanism and the damping material holding gap is free so that the degree of freedom in designing is improved, and application is enabled to a case of a support mechanism like a pivot bearing which is not preferably embedded in the damping material.

Also, according to a preferred embodiment, the narrow portion is formed of a projecting portion formed at least one of the two surfaces or the spring. Therefore, the narrow portion can be formed with a simpler structure.

Also, according to a preferred embodiment, the narrow portion is formed of a projecting portion provided to be projected from a part of the spring. Therefore, the narrow portion can be formed with a simpler structure.

BRIEF DESCRIPTION OF THE SEVERAL VIEWS OF THE DRAWING

The present invention will be understood more clearly from the drawings below integrated as a part in the present specification, the explanation above in the brief summary of the invention, and the detailed description of preferred embodiments described later.

FIG. 7 is a plan view of a blank material of a spring according to the first embodiment.

FIG. 8 is a cross-sectional view cut along a line 8—8 in FIG. 6.

FIG. 9 is a cross-sectional view cut along a line 9—9 in FIG. 6.

DETAILED DESCRIPTION OF THE INVENTION

In the following, a first embodiment of the present invention will be explained with reference to FIGS. 1 to 12. In this embodiment, the present invention is applied to an apparatus for supporting a movable portion of a galvano mirror used in a light pick-up device in a data recording/reproducing apparatus using a magneto-optical disk as a recording medium.

Figures 1, 2:
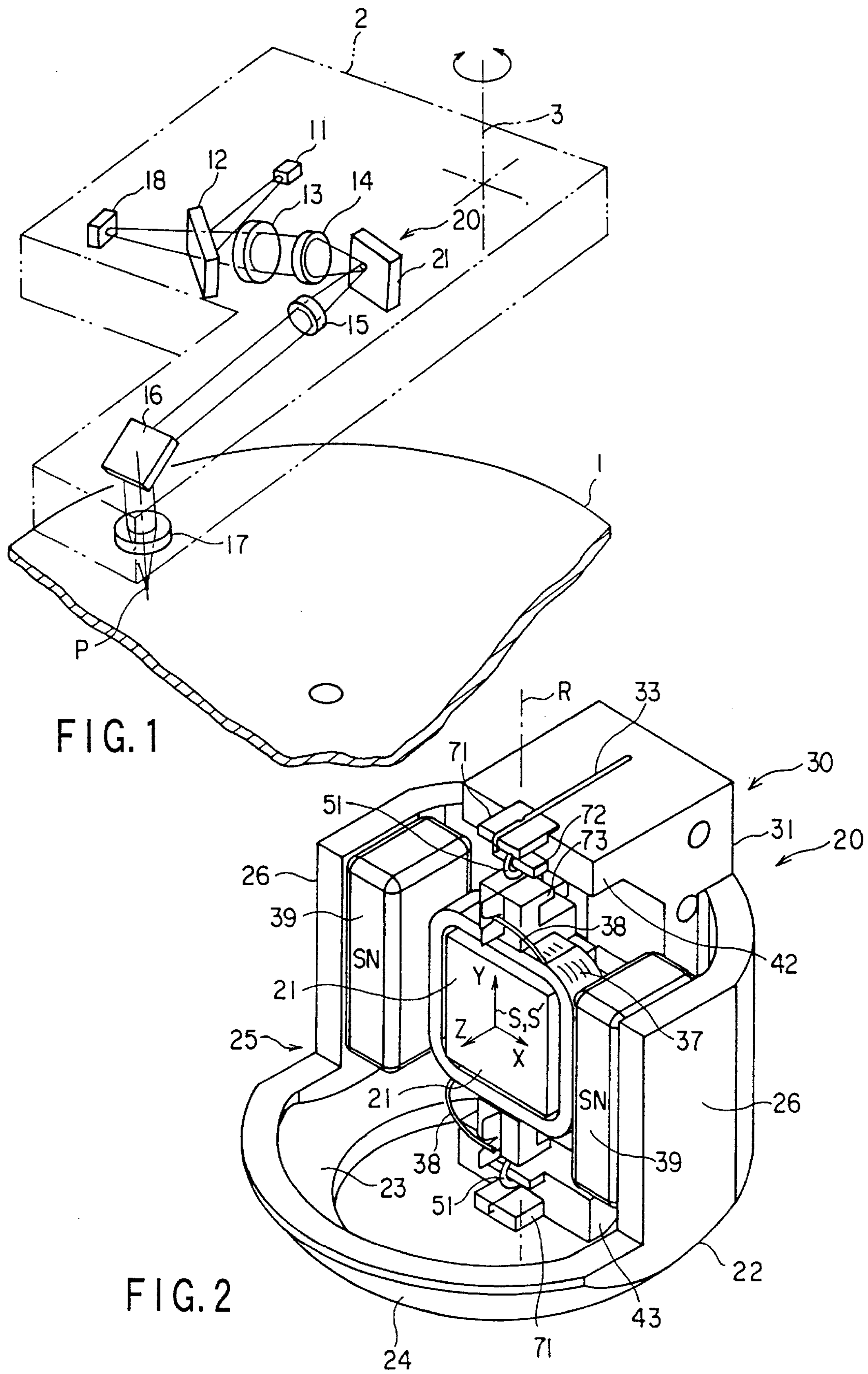
FIG. 1 is a schematic perspective view showing the structure of a light pick-up apparatus according to a first embodiment of the present invention.
FIG. 2 is a perspective view of a galvano mirror according to the first embodiment, viewed from the front side.

Firstly, the schematic layout of the optical element in the light pick-up device will be explained with reference to FIG. 1. In FIG. 1, the reference 1 denotes a magneto-optical disk, and an arm-like carriage 2 is provided along the recording surface of the magneto-optical disk 1. In the carriage 2, an optical system described later is provided, and a light spot P is focused on the recording surface of the magneto-optical disk 1 by the optical system, to perform writing and reading of data.

The carriage 2 described above is rotated by a drive mechanism (not shown) about a rotation shaft 3 as a center, and the top end portion thereof is mechanically moved to make coarse access. The optical system is provided with a galvano mirror 20 described later, and the spot P is optically moved to perform fine tracking.

Although no specific structure is shown in the figure, the carriage 2 described above is formed by die-cast molding of magnesium alloy or plastics, and the above optical system is included internally therein. Note that the carriage 2 may be formed by die-cast molding of aluminum alloy or plastics such as polyphenylene sulfide (PPS), liquid crystal plastics (LCP), polyether imide (PEI) or the like, other than die-cast of magnesium alloy described above.

This optical system comprises a laser diode 11 as a light source, and a part of light emitted therefrom is reflected on the surface of a beam splitter 12. The reflection light therefrom enters into a collimator lens 13 and becomes parallel light. Further, the parallel light is converged by a relay lens 14. Also, this optical system is provided with a galvano mirror 20 described later. The light converged by the relay lens 14 is reflected at a position before the focus position thereof by a mirror 21 of the galvano mirror 20, and is changed into parallel light again by a conversion lens 15. The parallel light travels in the arm portion of the carriage 2 along the lengthwise direction thereof, and is reflected by a fixed mirror provided at the top end portion of the arm portion. The reflection light enters into an objective lens 17 and focuses the light spot P described above, on the recording surface of the magneto-optical disk 1.

In addition, a part of returning light from the recording surface of the magneto-optical disk 1 is transmitted through the beam splitter 12 and enters into a photo-detector 18. Further, a signal such as a data reproducing signal, focusing error signal, tracking error signal, or the like is obtained by an output from this photo-detector 18. For example, the focusing error signal and tracking error signal are supplied to a control circuit (not shown) of the light pick-up device. By a control signal from the control circuit, the mirror 21 of the galvano mirror 20 is rotated about the mirror rotation shaft thereby to move the position of the light spot P in the tracking direction so that fine tracking described above is carried out. Also, by the control signal from the control circuit, the relay lens 14 is rotated in its optical axis direction by a drive mechanism (not shown) thereby to make focusing control of the light spot P on the magneto-optical disk 1.

In the present embodiment, each of the light paths from the laser diode 11 to the fixed mirror and to the photo-detector 18 is arranged in the plane parallel to the rotation plane of the carriage 2.

Next, explanation will be made of the structure of the galvano mirror 20 used in the light pick-up device of the present embodiment. FIG. 2 is a perspective view of the galvano mirror of this embodiment viewed from the front side, FIG. 3 is a perspective view thereof from the backside, and FIG. 4 is an exploded perspective view thereof.

Figure 3:
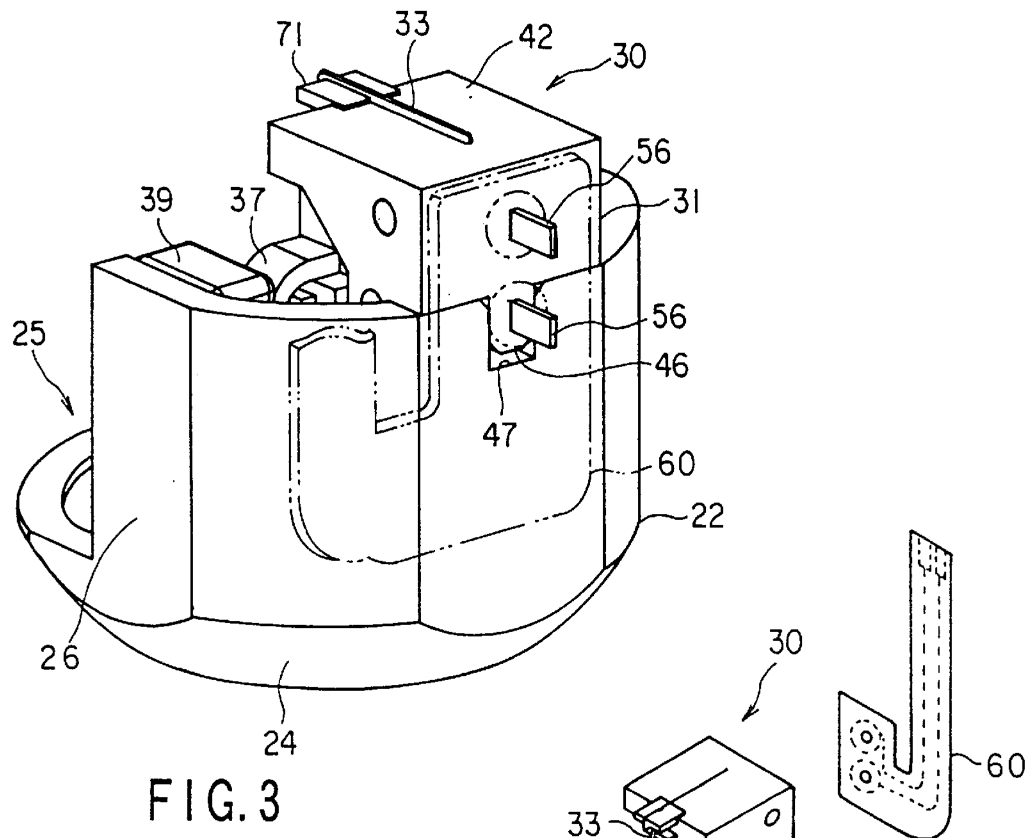
FIG. 3 is a perspective view of the galvano mirror according to the first embodiment, viewed from the rear side.
Figure 4:
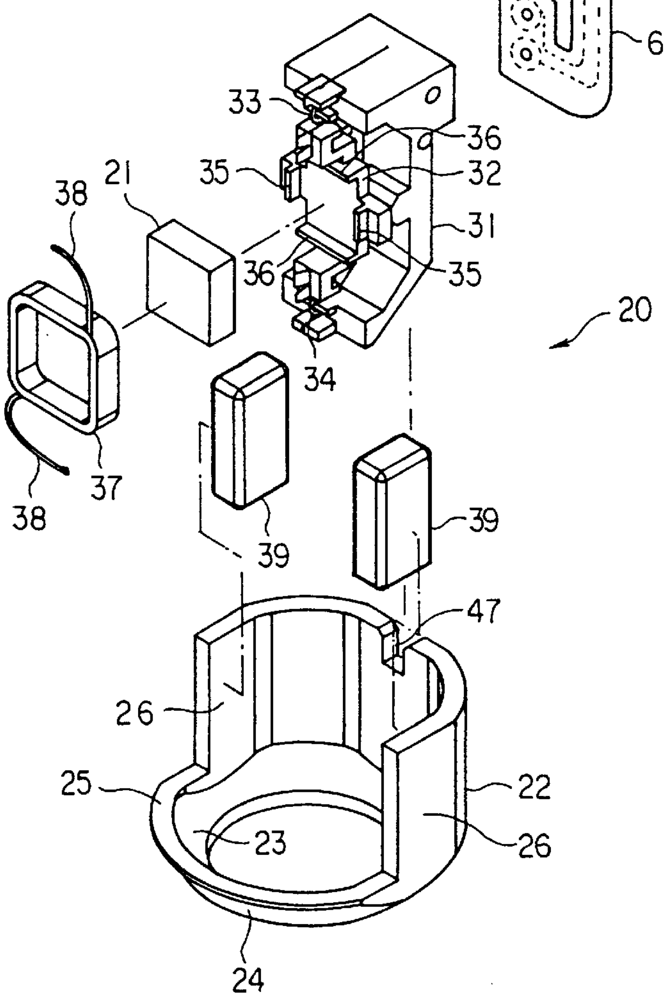
FIG. 4 is an exploded perspective view of the galvano mirror according to the first embodiment.

In FIGS. 2, 3 and 4 the reference 22 denotes a base member, and this base member 22 is formed by press-molding a steel plate material and has a substantially cylindrical shape having a bottom, as a whole. A hole is formed in the center portion of the bottom wall portion 23 of the base member 22 thereby forming a ring-like shape, and the lower surface of the bottom wall portion 23 is formed to be spherical as a supporting surface 24 for installing and adjusting the galvano mirror. The center of the supporting surface 24 corresponds to the position 0 of the light axis of the entering light on the reflection surface of the mirror 21. Among the circumferential walls of the base member 22, the front surface side of the mirror 21 is notched so that a light path opening 25 is formed for passing light.

Figure 11:
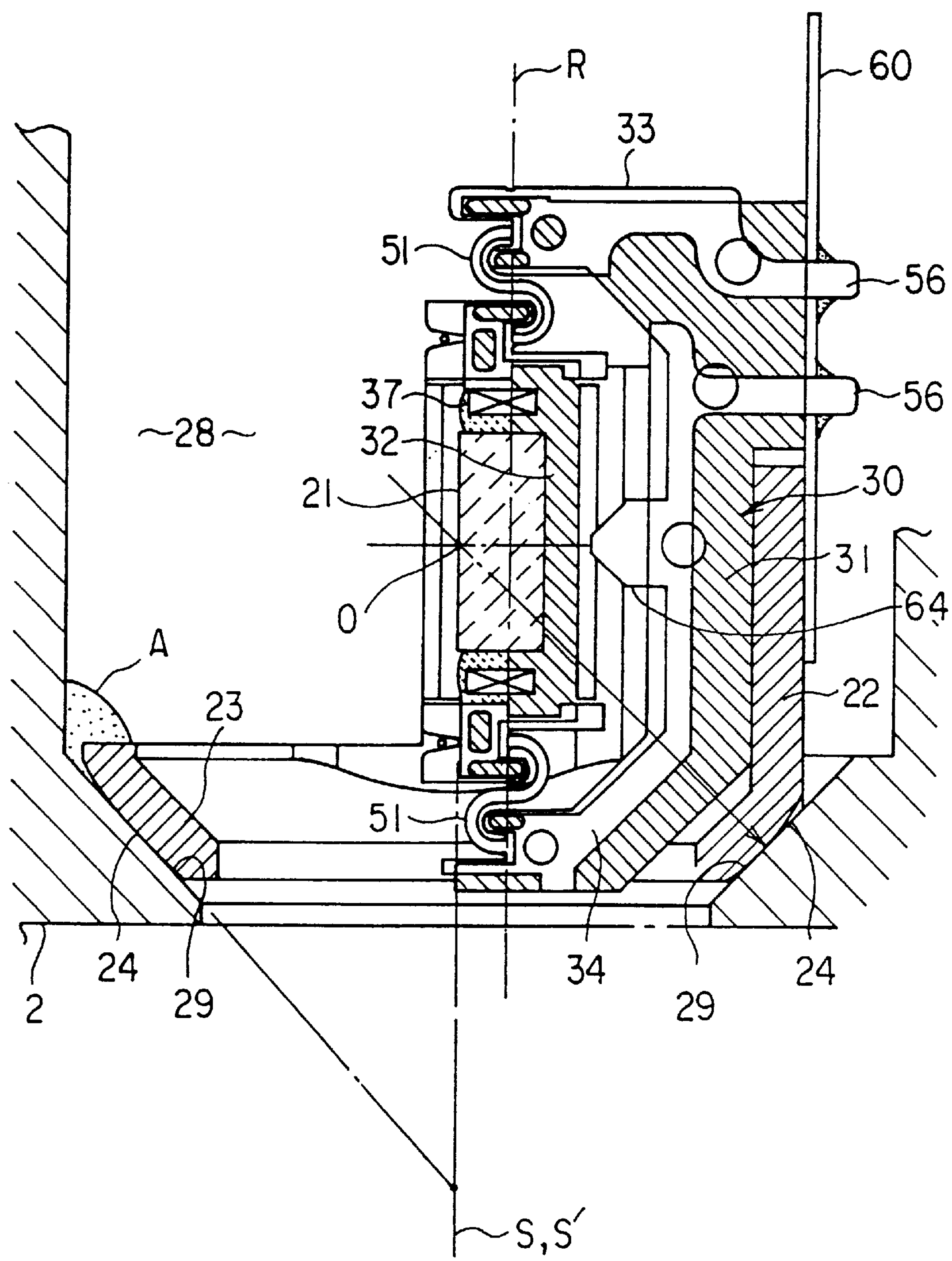
FIG. 11 is a longitudinal sectional view of a galvano mirror container section and a galvano mirror contained therein.
Figure 12:
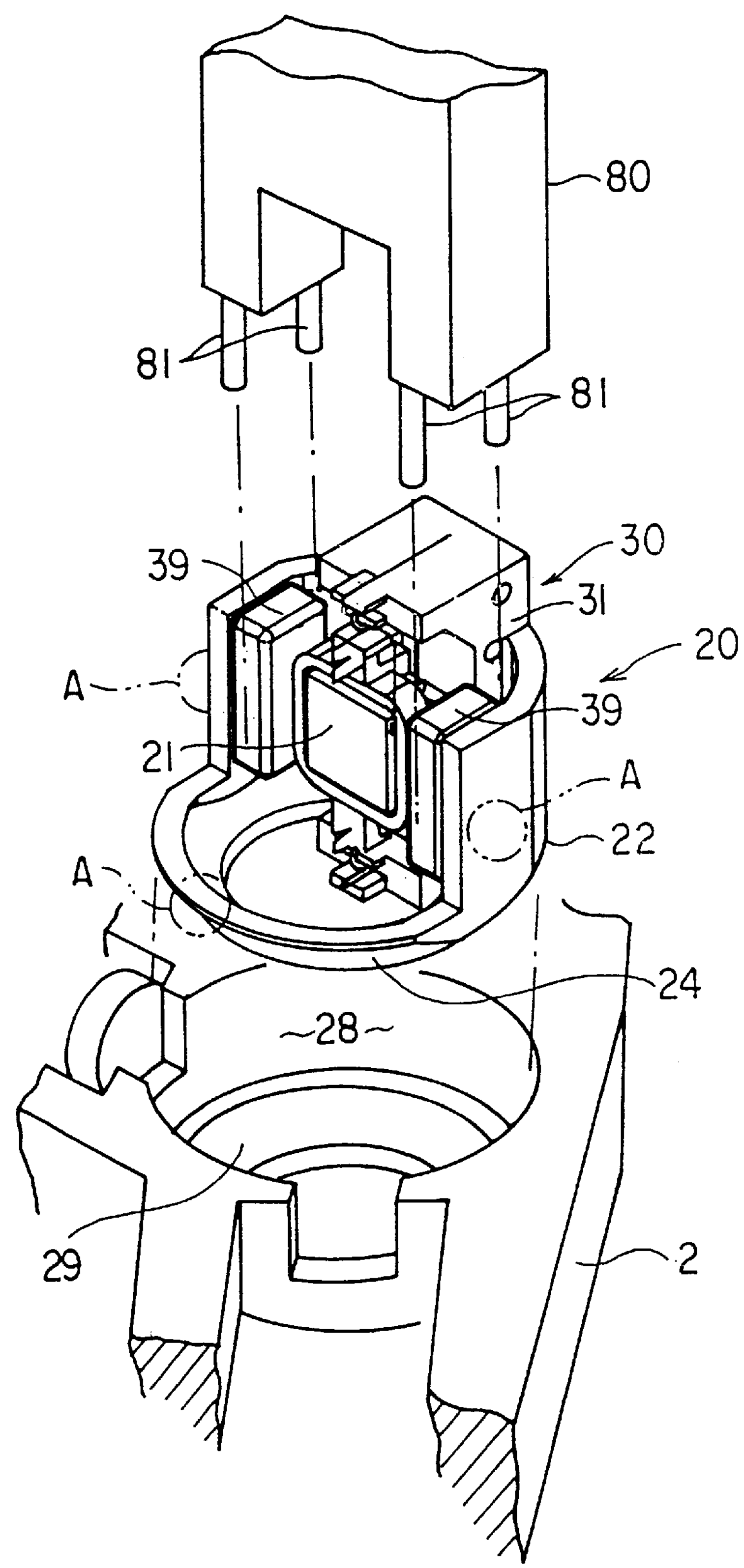
FIG. 12 is an exploded perspective view showing an installation state of a galvano mirror.

The galvano mirror 20 as described above is contained in a galvano mirror container section 28 formed in the carriage 2, as shown in FIGS. 11 and 12. This galvano mirror container section 28 has a shape substantially corresponding to the outer shape of the galvano mirror 20 as described above, i.e., a circular concave portion. The galvano mirror container section 28 is opened in the direction vertical to the plane where the light paths in the carriage 2 are provided, e.g., toward the upside. The opening direction of the galvano container section 28 is also the leaving direction when the carriage is subjected to die-cast molding with a metal mold.

Further, a ring-like bearing seat surface 29 is formed on the bottom portion of the galvano mirror container section 28. The bearing seat surface 29 is integrally formed when the carriage 2 is molded by die-casting, and has a shape like a conical surface. Further, the galvano mirror 20 inserted in the galvano mirror container section 28 is adjusted about its inclination, with the supporting surface 24 at the bottom kept in contact with the bearing seat surface 29, and is fixed at a predetermined position.

The center axis S of the supporting surface 24 of the galvano mirror 20 and the center axis S' of the bearing seat surface 29 are each arranged in parallel with the mirror rotation axis R as the rotation center axis of the mirror 21. In addition, the center axes S and S' of these supporting surface 24 and the bearing seat surface 29 are included in the reflection surface of the mirror 21 and are arranged so as to pass the position of the optical axis of the entering light on the reflection surface.

Further, a spring assembly 30 is contained in the base member 22. This spring assembly 30 is comprised of a fixing member 31 as a member in the fixed side, which is made of synthetic resin material in a cantilever-like shape, and a movable member 32 as a member in the movable side, which is made of also synthetic material and is supported to be rotatable in the front side of the fixed member 31. The movable member 32 is supported to be rotatable about the mirror rotation axis R parallel to the Y axis as shown in FIG. 2 by springs 33 and 34 described later.

Also, a mirror 21 is attached to the front surface of the movable member 32, and a substantially rectangular movable coil 37 is equipped so as to surround the mirror 21. A movable section is formed by the movable member 32, mirror 21, and the movable coil 37. The light paths of the entering light and reflection light which enter into the mirror 21 are arranged in a plane which includes the X-axis and Y-axis in FIG. 2. The mirror rotation axis R described above is parallel to the Y-axis as described above and passes the gravity center point of the entire movable section consisting of the movable member 32, mirror 21, and movable coil 37. The mirror rotation axis R corresponds to the main axis of inertia of the movable section.

Note that total four projections consisting of a pair of left and right positioning projecting portions 35 and a pair of upper and lower positioning projecting portions 36 are integrally projected on the front surface of the movable member 32. Further, the left and right side surfaces and the upper and lower surfaces of the mirror 21 are engaged on the inner surfaces of the positioning projecting portions 35 and 36, and the mirror 21 is positioned at a predetermined position on the front surface of the movable member 32. In addition, the movable coil 37 has left, right, upper, and lower inner circumferential surfaces engaged on the outer surfaces of the positioning projecting portions 35 and 36, and the movable coil is positioned at a predetermined position. Therefore, the positioning projecting portions 35 and 36 are interposed between the outer circumference of the mirror 21 and the inner circumference of the movable coil 37, and a predetermined clearance is formed therebetween.

Further, the movable member 32, mirror 21, and movable coil 37 are integrally adhered to each other by an adhesive material filled in the clearance. Accordingly, the movable section consisting of these components has a rectangular block-like shape as a whole and is also integrally joined to the others by an adhesive material. Therefore, the oscillation frequency inherent to the movable section is very high, and resonance generated when the movable section rotates is securely prevented.

Note that the fixed member 31 and the movable member 32 are formed of a non-conductive synthetic resin material reinforced by glass fibers, such as liquid crystal plastics (LCP), polyphenylene sulfide (PPS), polyether imide (PEI), polycarbonate (PC). In addition, the mirror 21 described above is obtained by forming a reflection film having a high reflection ratio, on a flat glass substrate. The movable coil 37 is obtained by winding a lead wire having a diameter 0.05 mm into four layers, and lead lines 38 are respectively led upper and lower portions thereof. Note that the power supply structure for the movable coil 37 will be described later.

In addition, the plan shape of the spring assembly 30 described above is substantially rectangular as described above, and this spring assembly 30 is inserted in the cylindrical base member 22 thereby forming spaces in both sides of the spring assembly 30. Note that an engaging projecting portion 46 is formed on the back surface of the fixed member 31 of the spring assembly 30, as shown in FIG. 3. In correspondence with the engaging projecting portion 46 described above, an engaging concave portion 47 is formed at the upper edge portion of the circumferential wall portion of the base member 22 in the back surface side thereof. Further, the engaging projecting portion 46 is engaged in the engaging concave portion 47, and the assembly is thereby positioned and engaged in the base member 22.

In the spaces in both sides of the spring assembly 30, fixed permanent magnets 39 each having a substantially rectangular block-like shape are respectively contained with their different poles opposed to each other. Those portions of the circumferential walls of the base member 32 that contain the permanent magnets 39 are formed on the flat surface portions 26 and are thus constructed so as to contain stably the permanent magnets 39.

The plan shape of the base member 33 is substantially circular, and the plan shape of each the spring assembly 30 and the permanent magnets 39 is rectangular. Therefore, since these components are contained and engaged in the base member 22, clearances are respectively formed in the rear side of the permanent magnets 39. These clearances are used as clearances where a positioning pin of a fitting tool is inserted when the galvano mirror 20 is adjusted and attached as will be described later.

Figure 5:
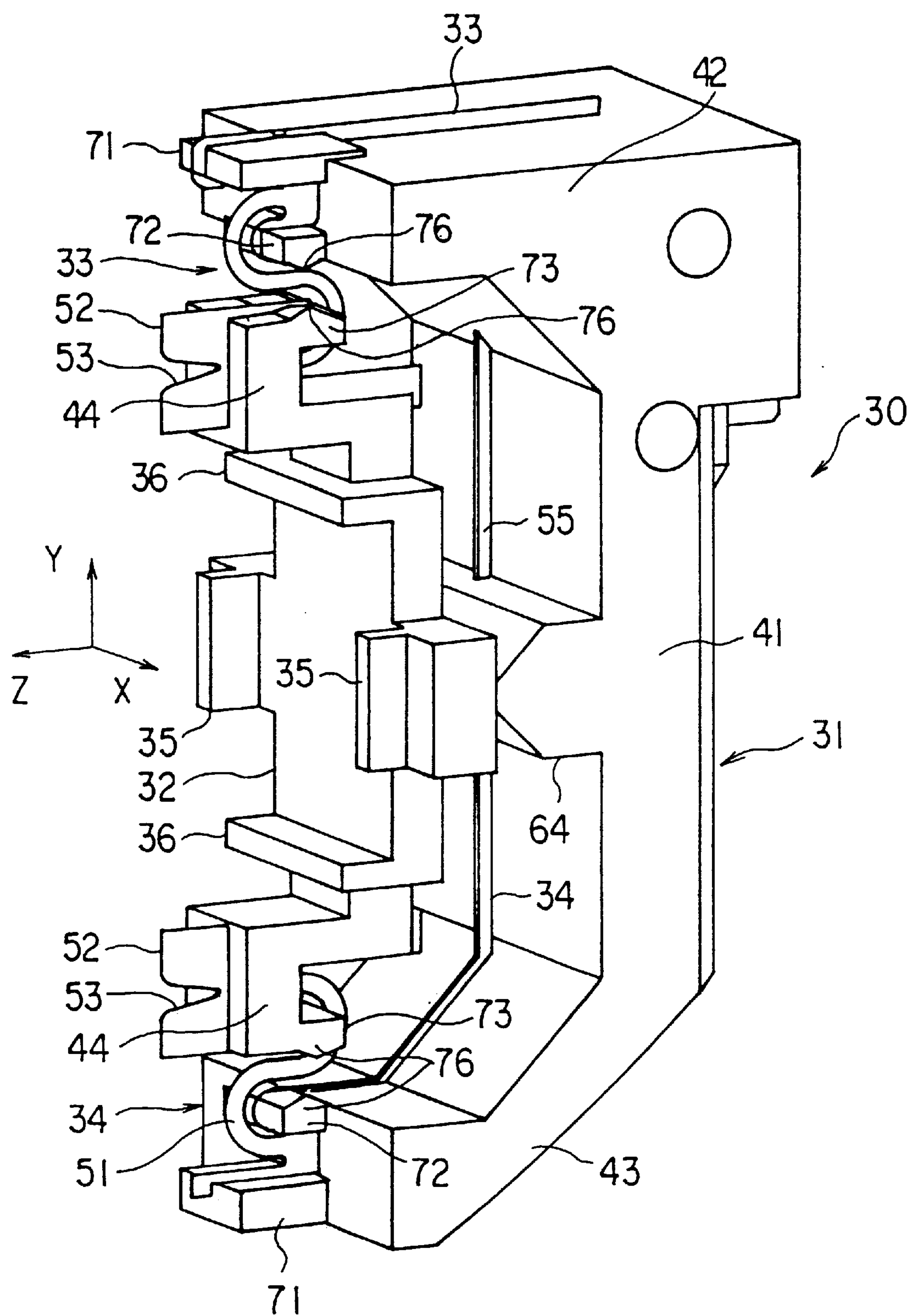
FIG. 5 is a perspective view of a spring assembly of the galvano mirror according to the first embodiment.

Next, explanation will be made of an apparatus for supporting the spring assembly 30 and the movable member 32. FIG. 5 shows a perspective view of the spring assembly 30. The fixed member 31 described above has a beam-like beam portion 41 and arm portions 42 and 43 projecting from the upper and lower end portions of the beam portion 41. Spring attachment portions 44 are formed to be projected integrally from the upper and lower end portions of the movable member 32, respectively. The arm portions 42 and 43 and the spring attachment portions 44 are jointed to be rotatable about the mirror rotation axis R described above. The joint structure of the springs 33, 34, fixed member 31, and movable member 32 is arranged as follows.

Figure 6:
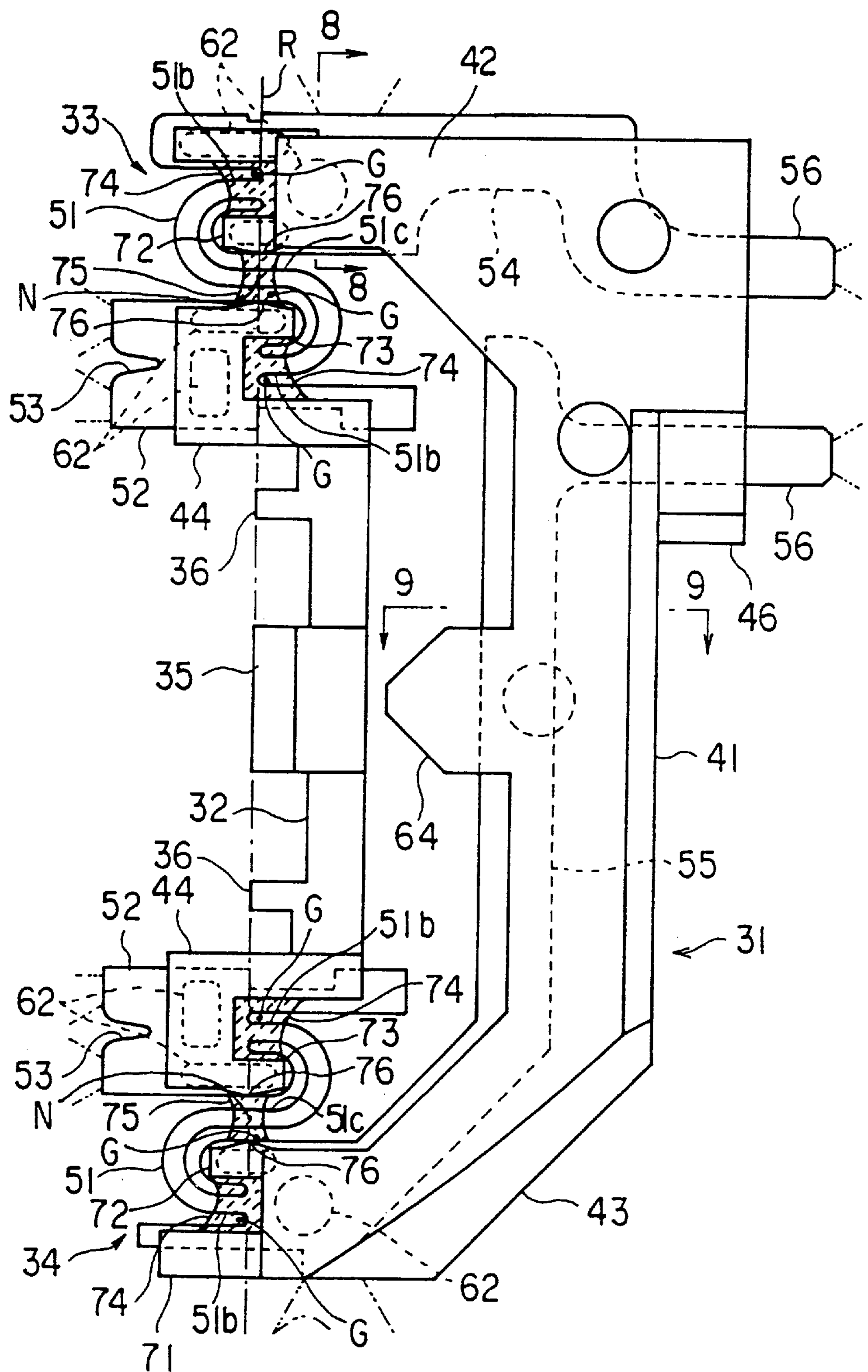
FIG. 6 is a schematic side view of the spring assembly of the galvano mirror according to the first embodiment.

FIG. 6 shows the shapes of the springs 33 and 34 and the layout relationship between the fixed member 31 and the movable member 32. FIG. 7 shows a state of a blank material before the springs 33 and 34 are incorporated in the fixed member 31 and movable member 32. These springs 33 and 34 also serve as members for rotatably supporting the movable member 32, reinforcement members for reinforcing the fixed member 31 and the like, and conductive members for supplying power to the movable coil 37 described above.

These springs 33 and 34 are obtained by processing thin plate materials of, for example, beryllium-copper alloy having a thickness of 0.03 mm into predetermined shapes by etching or the like, and gold plating is performed on the surfaces thereof to improve the corrosion resistant characteristic and soldering characteristic. Further, these springs 33 and 34 each include, for example, an S-shaped spring portion 51 curved in a S-shape, a terminal portion 52 formed to be continuous to an end portion of the S-shaped spring portion, reinforcement conductive portions 54 and 55, and a terminal portion 56 formed at the top end portions of the reinforcement conductive portions 54 and 55. V-shaped engaging notches 53 engaged with a lead line 38 of the movable coil 37 are respectively formed in the top end portions of the terminal portions 52 described above. The reinforcement conductive portion 55 of the lower spring 34 is formed to be substantially L-shaped.

The springs 33 and 34 are arranged in parallel with the Y-Z plane in FIGS. 2 and 5, and the terminal portion 52 and the reinforcement conductive portions 54 and 55 are embedded to be integral with the center surface and the symmetrical surface of the fixed member 31 and the movable member 32. The reinforcement conductive members 54 and 55 are metal plate materials and have high rigidity against bending and shearing deformation in the surface direction. Therefore, since these materials are embedded integrally in the beam portion 41 and the arm portions 42 and 43 in the fixed member 31, the rigidity of these parts is increased thereby preventing deformation due to loads and deformation due to thermal expansion according to temperature changes, so that the precision of the spring assembly 30 is increased. In addition, since the terminal portion and the reinforcement conductive portions 54 and 55 are embedded in the center planes of the fixed member 31 and the movable members 32, the spring assembly 30 is laterally symmetrical with respect to the center plane, so that irregular deformation is more efficiently prevented and the precision is more improved.

The terminal portion 52 of the upper spring 33 is integrally embedded in the spring attachment portion in the upper side of the movable member 32, and the top end portion of the terminal portion 52 projects from the top end surface of the spring attachment portion 44. Further, one of the lead lines 38 of the movable coil 37 is engaged in the engaging notch 53 at the top end portion and further joined thereto by soldering. In addition, the reinforcement conductive portion 54 is integrally embedded in the upper arm portion of the soldering member 31. Further, the terminal portion 56 at the top end of the reinforcement conductive portion 54 projects through the back surface of the fixed member 31, as shown in FIG. 3. Further, as shown in FIGS. 3 and 11, a terminal portion of a printed wiring board 60 is soldered to the terminal portion 54. Therefore, power is supplied to the movable coil 37 through the printed wiring board 60, the reinforcement conductive portion 54 of the spring 33, the S-shaped spring portion 51, the terminal portion 52, and the lead line 38.

In addition, as for the lower spring 34, the terminal portion 52 thereof is embedded in the spring attachment portion 44 in the lower side of the movable member 32, and the engaging notch 53 is engaged with and soldered to the other lead line 38 of the movable coil 37. In addition, the L-shaped reinforcement conductive portion 55 of this spring 34 is integrally embedded continuously in the lower arm portion 43 and beam portion 41 of the fixed member 31. Further, the terminal 56 at the top end of the reinforcement conductive portion 55 projects through the back surface portion of the fixed member 31 and is soldered to the other terminal portion of the printed wiring board 60, in a similar manner as described above. Also, in a similar manner as described above, power is supplied to the movable coil 37 through these components.

This kind of spring assembly 30 is assembled in the following manner. Firstly, a thin plate material of beryllium-copper alloy or the like as described above is processed by etching to manufacture a blank material 60 of a spring as shown in FIG. 7. This blank material 60 has a frame-like frame portion 61, and springs 33 and 34 as described above are integrally in the frame portion 61, with a predetermined layout relationship. Note that these springs 33 and 34 and frame portion 61 continue along the portion of a cut plan line C along which cutting is carried out after assembly. Also, for example, at four corners of the frame portion 61, positioning holes 63 are respectively formed for positioning.

Further, this blank material 60 is interposed between a pair of metal molds (not shown) and these molds are matched with each other. A resin material is injected into the cavity of these molds to form the fixed member 31 and movable member 32. At the same time, the portion of the springs 33 and 34 are integrally embedded in the center plane as a matching interface of the molds of the fixed member 31 and the movable member 32.

Note that the adhesive force between the resin material and the springs 33 and 34 is very small so that the embedded springs 33 and 34 are not integrated but the fixed member 32 and the movable member 31 sometimes crack into the left and right sides at these portions. To prevent this, through holes 62 are formed in appropriate portions of the springs 33 and 34, and for example, as shown in FIG. 8, an injected resin material is filled into these holes so that the fixed member 31 and the left and right parts of the movable member 32 are joined together and the springs 33 and 34 are integrated.

In addition, when injecting the resin material into the cavity of the metal molds, respective parts of the springs 33 and 34 are deformed in the cavity by the injection pressure thereof, and the respective parts of the springs 33 and 34 are shifted from the center or deformed, in some cases. To prevent this drawback, the top end portion of the terminal portion 52, the edge portions of the reinforcement conductive portions 54 and 55, and the terminal portion 56 are clamped and pressed between the metal molds, thereby to prevent these portions from being shifted or deformed in the cavity. Accordingly, the portions clamped and pressed between the metal molds project from the surfaces of the fixed member 31 and the movable member 32, as shown in FIGS. 8 and 9.

Note that the reinforcement conductive portion 55 is embedded substantially over the whole length of the beam portion 41 of the fixed member 31, and the edge portion thereof projects substantially over the whole length of the beam portion 41. Therefore, at the embedded portion where the reinforcement conductive portion 55 is embedded, the beam portion 41 is divided into left and right parts, and the strength and rigidity thereof are deteriorated. To prevent this drawback, through holes as described above are formed in the reinforcement conductive portion 55 and the left and right parts may be joined by the resin material filled in the through holes. However, if these through holes are formed, the strength and rigidity of the reinforcement conductive portion 55 are deteriorated. Therefore, at the center portion of the beam portion 41, a connection rib portion 64 is integrally projected in the direction crossing the beam. This connection rib portion 64 connects the left and right parts of the beam 41 together over the projecting edge portion of the reinforcement conductive portion 55. Therefore, the left and right parts of the beam 41 can be connected without forming through holes in the reinforcement conductive portion 55.

The connection rib portion 64 is opposed to the back surface of the movable member 32 and also serves as a stopper which restricts the maximum rotation angle of the movable member 32.

Further, after these springs 33 and 34 are integrally embedded in the fixed member 31 and the movable member 32, cutting is performed on the portion of the cut plan line, and the springs 33 and 34 are separated from the frame portion 61. The spring assembly is thus completed.

Next, the S-shaped spring portions 51 will be explained. These S-shaped spring portions 51 are arranged in parallel with the Y-Z plane in FIGS. 2 and 5 as described above, and support the movable member 32 to be rotatable about the mirror rotation axis R parallel to the Y-axis in FIGS. 2 and 5 but also function to prevent the movable member 32 as much as possible in the directions other than that axis.

Figures 10, 13:
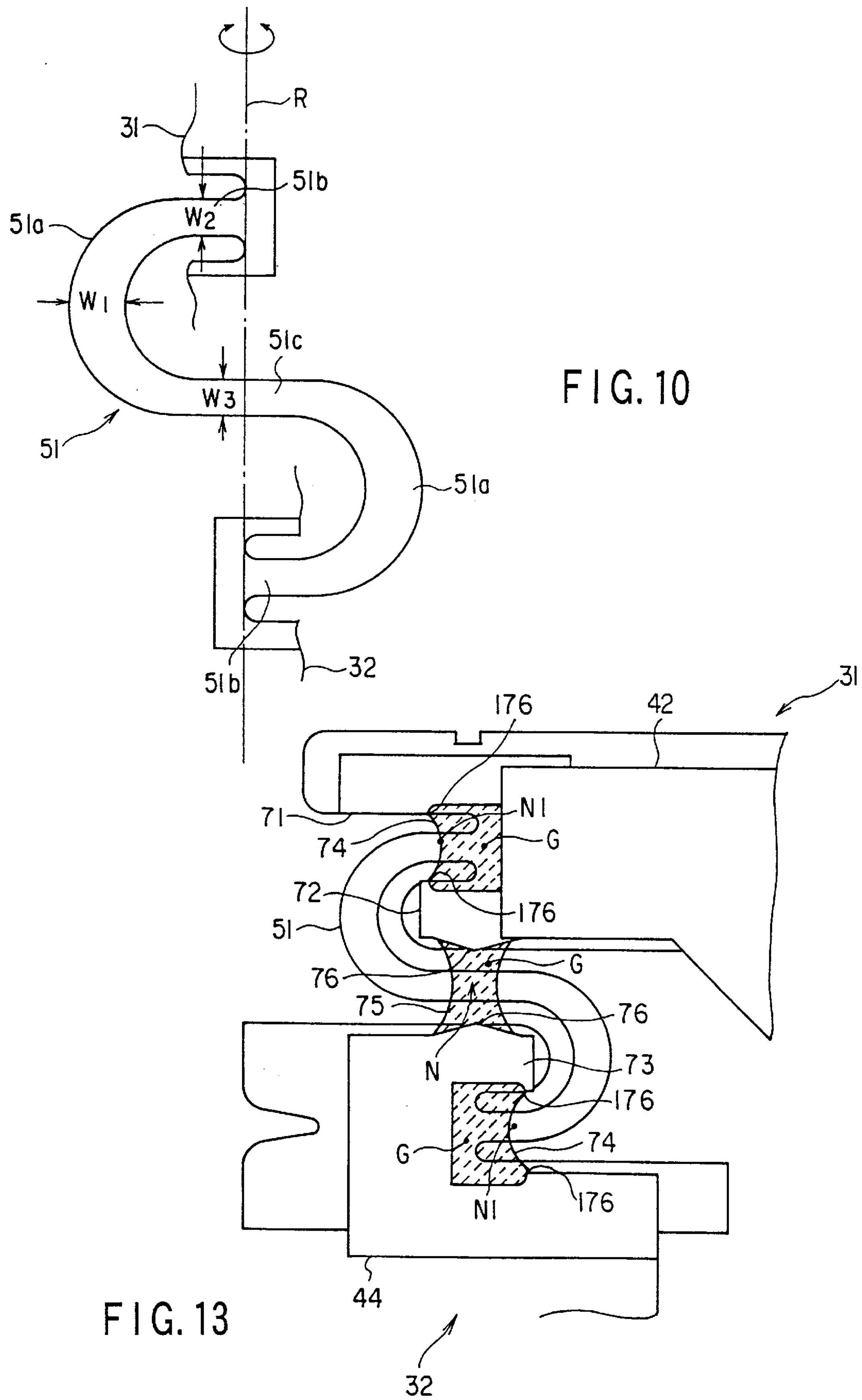
FIG. 10 is a schematic side view of a S-shaped spring portion of the spring.
FIG. 13 is a side view of a supporting apparatus according to a second embodiment.

FIG. 10 shows an enlarged view of the S-shaped spring portion 51, and a pair of substantially semi-circular curve portions 51*a*, end portions 51*b* thereof, and a substantially linear portion 51*c* which connects the other end portions of the curve portions 51*a* are integrally formed. Further, the end portions 51*b* described above are fixed in the side of fixed member 31 and in the side of the movable member 32.

The S-shaped spring portions 51 utilize the deformation characteristic of a thin plate to achieve the function as a support member as described above. In general, a thin plate material has a large dimension in the surface direction, relative to the thickness of the plate. Therefore, a thin plate material has the smallest rigidity with respect to simple bending deformation in the direction perpendicular to the surface direction, certainly high rigidity with respect to twisting deformation, and has the highest rigidity with respect to bending deformation or shearing deformation along both the directions. When the movable member 32 is rotated about the mirror rotation axis R in relation to the fixed member 31, simple bending deformation in the direction perpendicular to the surface direction is caused in the portions close of the mirror rotation axis R which means the base end portions of the end portions 51*b* and the center portion of the linear portion 51*c* of the S-shaped spring portion 51 although twisting deformation is caused at the portions apart from the axis R so that the twisting deformation becomes larger as the portions are more apart from the axis R. Consequently, simple bending deformation occurs concentrically at the portions close to the axis R, and the deformation amount is small at the portions apart from the axis R. Besides, the entire deformation of the S-shaped spring portion 51 is deformation symmetrical to the axis R as the center. Therefore, the S-shaped spring portion 51 supports the movable member 32 so as to rotate about the mirror rotation axis R so that the elastic force caused by the rotation about the mirror rotation axis is small.

Meanwhile, when the movable member 32 is moved to be inclined about the Y-axis direction, Z-axis direction, and X-axis direction, bending deformation and shearing deformation in the surface direction are caused in the S-shaped spring portion 51. The S-shaped spring portion 51 has high rigidity with respect to bending deformation and shearing deformation in the surface direction, as described above, and therefore, the supporting rigidity of the movable member 32 is high with respect to these directions. In particular, although movement in the Z-axis direction and inclination about the X-axis are caused by factors of optical errors such as a displacement of the light focus point of light reflected by the mirror 21 attached to the movable member 32 and an inclination of the optical axis, the supporting rigidity in these directions is high as described above so that these optical errors can be excluded effectively.

When the movable member 32 is moved in the direction of the X-axis and when it is inclined about the Z-axis, twisting deformation is caused at the end portions 51*b* and the linear portion 51*c* of the S-shaped spring portion 51 and simple deformation is caused at the center portions of the bending portions 51*a*, so that the rigidity is lowered relatively. The movement in these directions is simply a movement of the mirror 21 in the direction parallel to the reflection surface thereof and does not cause a substantial displacement of the reflection surface. Therefore, no optical error is caused.

Further, the S-shaped spring portion 51 is formed in a shape as described below in order that movement in the Z-axis direction, inclination about the Z-axis which are factors causing an optical error are reduced as much as possible, i.e., that the bending deformation and the shearing deformation of the S-shaped spring 51 in the surface direction are reduced as much as possible. As shown in FIG. 10, the S-shaped spring portion 51 is arranged such that the widths $W_2$ and $W_3$ of the end portions 51*b* and the linear portion 51*c* are narrow while the width $W_1$ of the curve portions 51*a* is wide. For example, in this embodiment, the widths $W_2$ and $W_3$ of the end portions 51*b* and the linear portion 51*c* are each set to 0.08 mm and the width $W_1$ of the curve portions 51*a* is set to 0.16 mm.

To increase the rigidity of the S-shaped spring portion 51 against bending deformation and shearing deformation, the widths of respective portions of the S-shaped spring portion 51 may be widened. However, if the widths are uniformly widened, the rigidity of the end portions 51*b* and the linear portion 51*c* against simple bending in the direction perpendicular to the surface direction is increased so that the rigidity against deformation about the mirror rotation axis R is increased. However, if the width $W_1$ of the curve portions 51*a* is widened as described above, the rigidity of the end portions 51*b* and the linear portion 51*c* against simple bending in the direction perpendicular to the surface direction is substantially unchanged but the rigidity of the curve portions 51*a* against bending deformation and shearing deformation in the surface direction thereof is increased. Meanwhile, when deformation about the mirror rotation axis R is caused as described above, the end portions 51*b* and the linear portion 51*c* close to the mirror rotation axis R are mainly bent and deformed while deformation is small at the curve portions 51*a* positioned apart from the axis R. Accordingly, increase of the rigidity about the mirror rotation axis R is slight in this case.

Since the S-shaped spring portion 51 described above functions as a member which ensures rotatable supporting about the mirror rotation axis R, it is preferred for the characteristic of this portion that the rigidity $G_Z$ against deformation in the other direction which is the Z-axis direction in FIG. 5 is larger than the rigidity $G_R$ against deformation about the axis R, i.e., $G_Z/G_R$ is as large as possible.

Next, explanation will be made of results of a test conducted to confirm the result as described above. In this case, since the above S-shaped spring portion 51 has a small size, it is difficult and inaccurate to measure directly the rigidity in the respective directions of the S-shaped spring portion 51. Taking into consideration this condition, the ratio of rigidity of $G_Z/G_R$ described above was indirectly measured in the following manner.

Firstly, as a comparative example, a spring having a plate thickness of 0.03 mm and a uniform width of 0.08 mm over the entire S-shaped spring portion was prepared, and a spring according to the embodiment as described above in which the end portions 51*b* and the linear portion 51*c* each had a width of 0.08 mm and the width $W_1$ of the curve portion 51*a* was 0.16 mm prepared. These springs were integrated with same fixed members 31 and same movable members 32, and thus, spring assemblies 30 were prepared.

Further, natural frequencies of the movable member 32 in respective directions were measured. Firstly, with respect to the comparative example having a uniform width, the natural frequency $f_R$ of the movable member 32 about the mirror rotation axis and the natural frequency $f_Z$ of the movable member in the Z-axis direction were measured, and as a result, $f_R$=128 Hz and $f_Z$=718 Hz were obtained. Meanwhile, the natural frequencies were measured likewise with respect to the spring according to the embodiment, and as a result, $f_R$=159 Hz and $f_Z$=1414 Hz were obtained. Further, as a result of calculating the ratios of them, the comparative example having a uniform width had $f_Z/f_R$ of 5.6 while the spring according to the present embodiment had $f_Z/f_R$ of 8.9. Further, since the ratio of rigidity of the S-shaped spring portion is $(f_Z/f_R)^2$, the comparative example described above had $(f_Z/f_R)^2$ of about 31, i.e., the ratio of the rigidity about the mirror rotation axis and the rigidity in the Z-axis direction was about 31. In contrast, the spring according to the present embodiment had $G_Z/G_R$ of about 79. Accordingly, the $G_Z/G_R$ of the spring according to the present embodiment was as about 2.6 times high as that of the comparative example. Therefore, in the spring according to the present embodiment, the rigidity $G_Z$ in the Z-axis direction is about 2.6 higher than the comparative example if the rigidity $G_R$ about the mirror rotation axis R is set to be equal to that of the comparative example. That is, for example, the amount by which the movable portion 32 is moved due to resonance or oscillation is 1/2.6, i.e., the displacement of light reflected by the mirror 21 is 1/2.6. It is thus possible to obtain a galvano mirror with high accuracy and a stable tracking characteristic.

Also, as a form of the support member described above, the S-shaped spring 51 as described above is used. As for the spring as a support member for the galvano mirror 20, the effective length of the spring is preferably long in order to reduce the maximum stress which occurs at the support member thereby to improve the reliability of the support member. However, if it is elongated in the support member mirror rotation axis direction, the size of the galvano mirror 20 is very large and hinders downsizing of the apparatus. Therefore, in the present embodiment, the spring as a support member is formed in a S-shape and the spring length between the end portions 51*b* and 51*b* of the spring is elongated while the linear distance between the two end portions 51*b* and 51*b*.

Further, in the present embodiment, installation of the end portion 51*b* onto the fixed member 31 and installation of the end portion 51*b* to the movable member 32 are situated in the Z-direction as a direction vertical to the direction of the mirror rotation axis R. Therefore, the dimension in the mirror rotation axis R direction can be arranged to be very small including the attachment portion for the S-shaped spring 51 as a support member. Therefore, the reliability can be improved by reducing the dimension of the galvano mirror 20 in the mirror rotation axis R direction to reduce the power consumption and to reduce the maximum stress generated at the support member.

In addition, the movable member 32 is supported to be rotatable about the mirror rotation axis R by deformation of the S-shaped spring portions 51 of the springs 33 and 34. Since the S-shaped spring portion 51 has a predetermined spring constant with respect to deformation about the mirror rotation axis R, the movable member 32 oscillates about the mirror rotation axis R. Further, to damp such oscillation of the movable member 32, there is provided a damping mechanism as follows.

That is, as shown in FIGS. 5 to 6, upper and lower pairs of projecting portions 71 and 72 are respectively provided at the top end portions of the arm portions 42 and 43 of the fixed member 31, such that one end portion 51*b* of each spring portion 51 of the springs 33 and 34 is surrounded thereby. In addition, the spring attachment portions 44 of the movable member 32 are respectively provided with projecting portions 73, and the spring attachment portions 44 are formed like a U-shape such that the other end portions 51*b* of the S-shaped spring portions 51 are surrounded thereby. In addition, by the projecting portions 72 and 73 described above, the linear portion 51*c* of the S-shaped spring portion 51 is surrounded thereby.

Further, the concave portion formed between the projecting portions 71 and 72 and the clearance between the projecting portions 72 and 73 are filled with damping materials 74 and 75, respectively. The end portions 51*b* of the S-shaped spring portions 51 are embedded in the damping materials 74, and the linear portion 51*c* of the S-shaped spring portion 51 is embedded in the damping material 75 described above. These damping materials 74 and 75 are, for example, obtained in a manner in which predetermined amounts of thermosetting silicon gel material having fluidity in an unhardened liquid state are injected and held in the concave portions and the clearance, and the spring assembly 30 is thereafter heated in an oven, for example, at 70° C. for 30 minutes, so that the unhardened gel material is hardened to form silicon gel material having a predetermined viscosity.

Accordingly, if the movable member 32 is rotated about the mirror rotation axis R, the end portions 51*b* and the linear portion 51*c* of the S-shaped spring portion 51 are deformed in the damping materials 74 and 75 thereby generating a predetermined damping force due to the viscosity resistance, so that the oscillation of the movable member 32 is damped.

When the unhardened damping materials 74 and 75 are injected and held, cohesion is effected such that the free surfaces are minimized by the surface tension. Accordingly, the liquid lump of the unhardened damping material 74 is held at a deep portion in the concave portion formed between a pair of projecting portions 71 and 72 and is held at a predetermined position with the end portion 51*b* embedded at the center portion. In addition, the liquid lump of the unhardened damping material 75 is held between the projecting portions 72 and 73 and is held such that the linear portion 51*c* of the S-shaped spring portion 51 is embedded in the center thereof.

The clearance formed between two surfaces of a pair of projecting portions 71 and 72 opposed to each other is formed as a damping material maintaining gap G for holding the damping material 74 as described above. In this case, since the damping material holding gap G is formed between a pair of projecting portions 71 and 72 formed on the fixed member 31, the damping material holding gap G can be formed in an arbitrary shape. Therefore, for example, as in the present embodiment, the damping holding gap G can be formed as a U-shaped concave portion having a back wall portion and the injected unhardened damping material can be directly held securely at a deep portion as described above, so that the damping material 74 can be securely held at a precise position. Note that the damping material holding gap G formed by the projecting portion 73 of the spring attachment portion 44 of the movable member 32 is the same as above.

In addition, a damping material holding gap G is also formed between the projecting portions 72 and 73, e.g., between these two opposed surfaces. In this case, these two surfaces are relatively moved and the S-shaped spring portion 51 is deformed, by rotation of the movable member 32. Therefore, the damping material 75 applies a damping force to both of the surfaces so that a much larger damping force can be obtained.

However, if the surfaces of the projecting portions 72 and 73 opposed to each other are parallel planes, the cross-sectional shape of the linear portion 51*c* is constant in the Z-axis direction and the free surface thereof does not change even when the liquid lump of the damping material 75 is moved in the lateral direction in FIG. 6, i.e., in the Z-direction in FIG. 5. Therefore, the liquid lump of the damping material 75 is movable to an arbitrary position in the Z-direction, and the holding position thereof is not constant. To prevent this drawback, in the present embodiment, convex portions 76, each of which continues in the X-axis direction and has a convex cross-section, are formed respectively on the surfaces of the projecting portions 72 and 73 which are opposed to each other. At the portion where these convex portions 76 are opposed to each other, the width of the damping material holding gap G is narrowed and a narrow portion N is thus formed. Accordingly, when the liquid lump of the damping material 75 moves in the Z-axis direction, a difference appears between the areas of the free surfaces in both sides, and the liquid lump moves to a position where the surface tensions of the free surfaces in both sides are balanced. The liquid lump is held stably at this position, i.e., at the narrow portion N. Therefore, it is possible to accurately hold the damping material 75 at a predetermined position.

Note that as the damping materials 74 and 75, it is possible to use arbitrary material having a damping characteristic, such as a ultraviolet-hardening silicon gel, acrylic gel, butyl rubber liquidized by a solvent, silicon oil, or the like, other the materials described above.

Next, explanation will be made of operation of an installation apparatus for attaching the galvano mirror 20 constructed as described above into the galvano mirror container section 28 of the carriage 2 and for installing the mirror at a predetermined position by adjusting the inclination thereof or the like, with reference to FIGS. 11 and 12.

Firstly, as described above, the spherical support surface 24 formed on the bottom surface of the base 22 of the galvano mirror 20 has a center axis S which is parallel to the mirror rotation axis R and is included in the reflection surface of the mirror 21. In addition, the center point of the spherical surface of the support surface 24 corresponds to the position O of the optical axis of the entering light on the reflection surface of the mirror 21. Also, the bearing seat surface 29 in form of a conical surface formed at the bottom portion of the galvano mirror container portion 28 of the carriage 2 has a center axis S', which is parallel to the mirror rotation axis R, is included in the reflection surface of the mirror 21, and passes through the position O of the optical axis of the entering light on the reflection surface of the mirror 21.

Further, as shown in FIG. 12, the galvano mirror 20 is held by a fitting tool 80. This fitting tool 80 has a lower end portion having an inverted U-shape, and for example, four positioning pins 81 are projected from the load bearing portions of the tool. In addition, an electromagnet (not shown) is included in the fitting tool 80.

This kind of fitting tool 80 is engaged closely with the galvano mirror 20 from upside, and the electromagnet is excited thereby to magnetically suction and hold the galvano mirror 20. In this case, the positioning pins 81 are inserted in the gaps formed in the rear side of the permanent magnets 39 and in the front side thereof, and the front and rear sides of the permanent magnets are clamped and held between the positioning pins 81. In this manner, the galvano mirror 20 is held positioned at a predetermined position with respect to the fitting tool 80.

Next, the galvano mirror held by the fitting tool 80 is inserted into the galvano mirror container portion 28 from an upper end opening portion thereof. The inserting direction is a direction parallel to the mirror rotation axis R, i.e., the direction parallel to the center axis S of the support surface 24 and the center axis S' of the bearing seat surface 29. The galvano mirror 20 thus inserted is situated such that the support surface 24 is seated on the bearing seat surface 29 and the center axes S and S' correspond to each other.

In this state, the galvano mirror 20 is pressed downward with a predetermined pressure force of, for example, about 100 gf by a fitting tool 80 and the support surface 24 is kept in contact with the bearing seat surface 29. While making them slide on each other, the inclination of the galvano mirror 20 is inclined, for example, rotated about the mirror rotation axis R, i.e., about the Y-axis and the X-axis, thereby to adjust the inclination thereof about the Z-axis parallel to the reflection surface of the mirror 21 with respect to the optical axis of the optical system. Note that this adjustment is carried out by injecting light from the laser diode 11 into the mirror 21 of the galvano mirror 20, by detecting the inclination of light emitted from the fixed mirror 1*b* with respect to the reference surface of the carriage 2 by means of a auto-collimator, and by automatically controlling the fitting tool 80 by means of a control device (not shown) or the like.

Further, after the adjustment service as to the inclination as described above is completed, the galvano mirror 20 is maintained at the position, and an adhesive agent A is injected and hardened between the galvano mirror 20 and the inner surface of the galvano mirror container section 28, e.g., between the front edge portion and both side surface portions of the base member 22 and the inner surface of the galvano mirror container section 28, or between the support surface and the bearing seat surface 29. The galvano mirror 20 is thereby fixed at a predetermined installation position. Further, thereafter, the fitting tool 80 is pulled out upward.

Note that the present invention is not limited to the first embodiment described above. For example, FIG. 13 shows a second embodiment of the present invention. In this embodiment, narrow portions N1 are formed at the concave damping material holding gap G formed between two surfaces of the projecting portions 71 and 72 opposed to each other and at the opening end portion of the damping material holding gap G formed between two surfaces consisting of a surface of the projecting portion 73 and a surface opposed thereto. These narrow portions N1 are formed between the projecting portions 176 formed on the surfaces of the projecting portions 71 and 72 opposed to each other and between the projecting portion 73 and the projecting portion 176 formed on the surface opposed thereto.

In this narrow portion N1, since the width of the damping material holding gap G is narrowed, the free surface of the damping material 74 tends to minimize the area thereof and therefore tends to move to the narrow portion N. Therefore, the free surface of the damping material 74 is stable at the narrow portions N1, and the damping material 74 is thereby held at a predetermined position more securely.

Due to the structure as described above, the position of an end of the damping material 74 forms a narrow portion N1 so that the length dimension of the damping material 74 which acts on the spring portion is stable. Therefore, it is possible to obtain a stable damping characteristic and a spring characteristic.

Note that this embodiment has the same structure as that of the first embodiment except for the point described above, and the portions in FIG. 13 that correspond to those of the first embodiment are referred to by same reference symbols and explanation thereof will be omitted herefrom.

Figure 14:
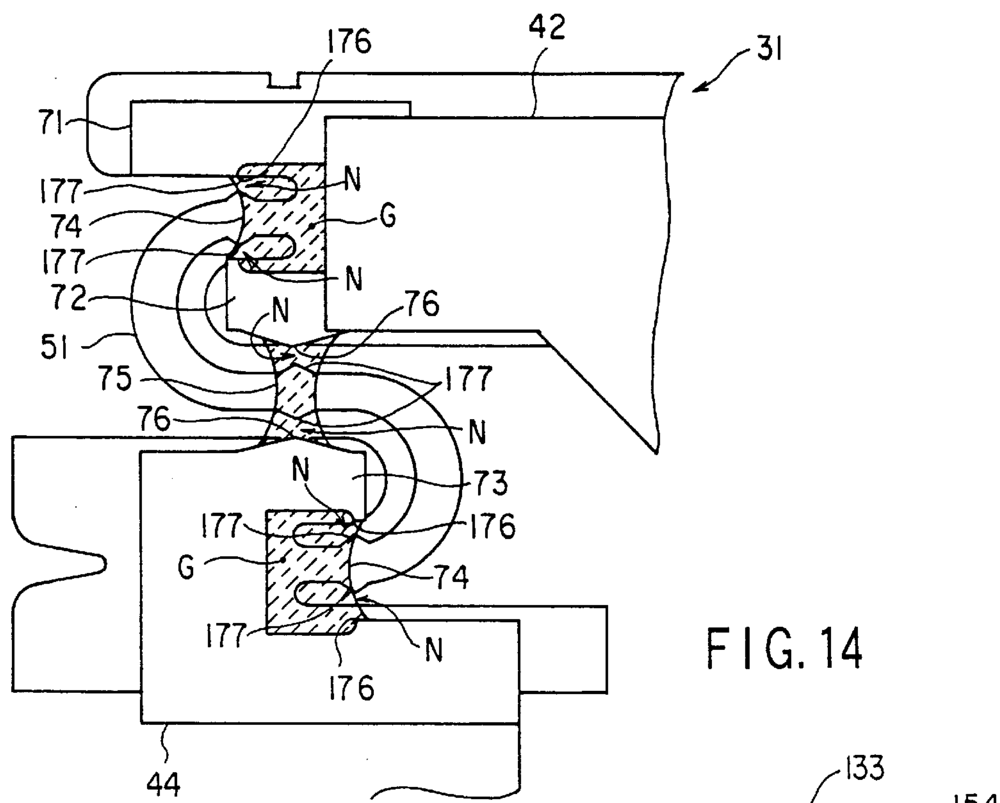
FIG. 14 is a side view of a supporting apparatus according to a third embodiment.

In addition, FIG. 14 shows a third embodiment of the present invention. In this embodiment, projecting portions 177 are respectively provided to be projected integrally from the S-shaped spring portion 51, at those portions of the S-shaped spring portion 51 that are opposed to the projecting portions 176 and the convex portions 76. In this embodiment, narrow portions N are respectively formed between the projecting portions 176 and the projecting portions 177 and between the convex portions 76 and the projecting portions 177. These narrow portions N have a narrowed width so that the damping materials 74 and 75 can be held more securely at predetermined positions.

Note that this embodiment has the same structure as that of the second embodiment described above, except for the point described above. Those portions in FIG. 14 that correspond to those of the second embodiment will be referred to by same reference symbols and explanation thereof will be omitted herefrom.

Figure 15:
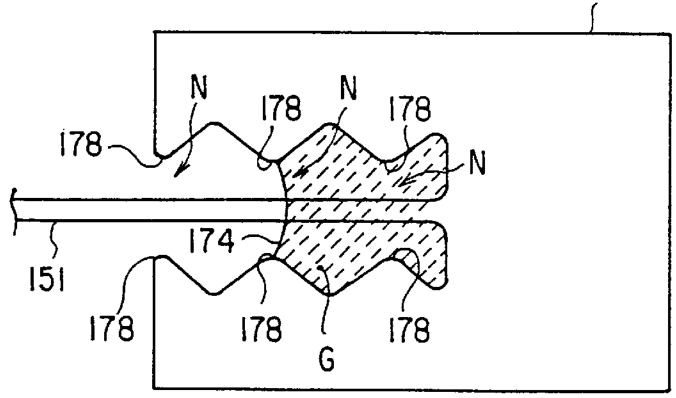
FIG. 15 is a side view of a supporting apparatus according to a fourth embodiment.
Figure 16:
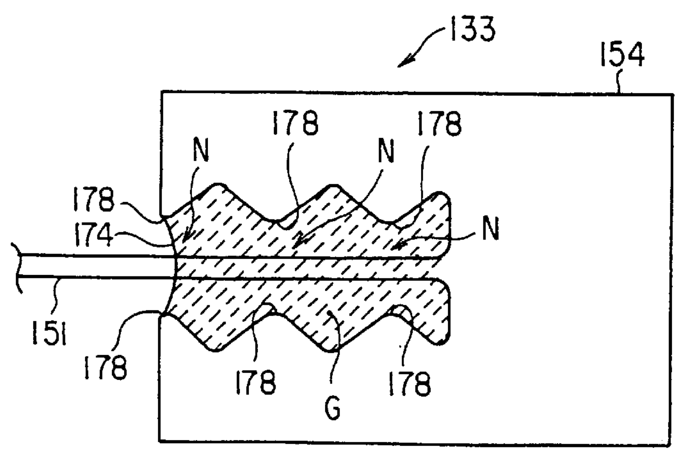
FIG. 16 is a side view of the supporting apparatus according to the fourth embodiment in another state.

FIGS. 15 and 16 show a fourth embodiment of the present invention. In this embodiment, damping material holding gaps are formed in the springs. Specifically, the reference 133 in the figures denotes a spring forming part of the supporting apparatus. The spring 133 is made of a thin plate material and comprises a support spring portion 151 and a spring end portion 154. The spring end portion 154 is attached to a member in the fixed side (not shown). Further, a member in a movable side (not shown) is supported on the other end portion of the support spring portion 151, and the member in the movable side is supported to be movable in a predetermined direction or rotatable about a predetermined rotation axis by bending or twisting the support spring portion 151 to be deformed.

The spring end portion 154 has a substantial U-shape as a whole and forms a damping material holding gap constituted by the inner edge surface of the U-shaped spring end portion 154 and both edge surfaces of the end portion of the support spring portion 151. A damping material 174 is held in the damping material holding gap G. In addition, a plurality of projecting portions 178 are integrally formed on the inner edge of the U-shaped spring end portion 154, and a narrow portions N is formed between those projecting portions 178 opposed to each other. Further, the free surfaces of the damping material 174 is held in the narrow portion N, for example, between the projecting portions 178 at the top end portion of the damping material holding gap G, thereby stably holding the damping material 174 at a predetermined position.

In this embodiment, since a plurality of narrow portions N are formed between the plurality of projecting portions 178, holding of the damping material 174 at the long holding portion is ensured much more. In addition, in this embodiment, since a plurality of narrow portions N are formed, the free surface of the damping material 174 can be held at a narrow portion N between an arbitrary pair of projecting portions 178 such as a second narrow portion N from the top end portion, as shown in FIG. 16, if the amount of the damping material 174 to be held is changed.

Note that this embodiment is also applicable to a support member of a objective lens supporting apparatus as disclosed in the Japanese Patent Application KOKAI Publication No. 6-314432 described above.

Figure 17:
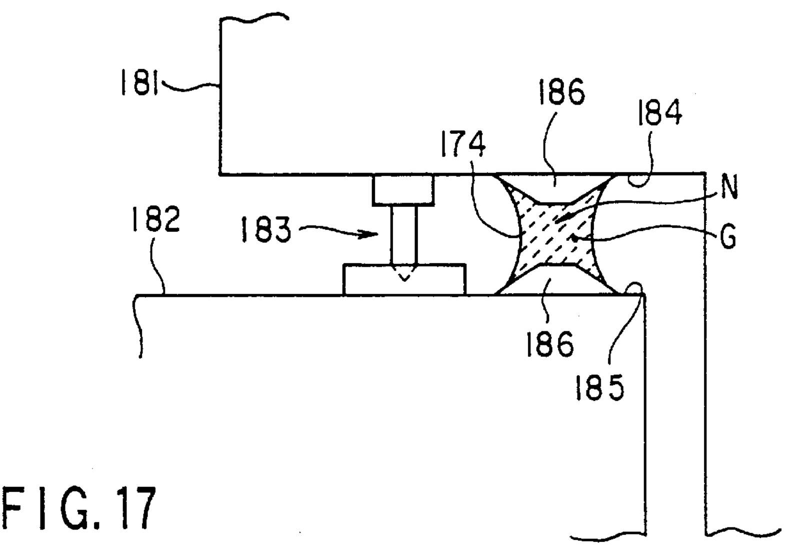
FIG. 17 is a side view of a supporting apparatus according to a fifth embodiment.
Figure 18:
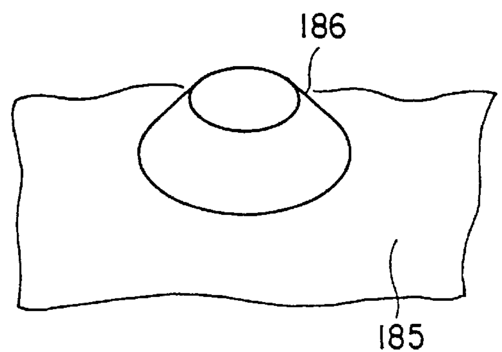
FIG. 18 is a perspective view of a projecting portion of the supporting apparatus according to the fifth embodiment.

FIGS. 17 and 18 show a fifth embodiment of the present invention. This embodiment is suitable for a case where the support mechanism of the member in the movable side is, for example, a pivot bearing. Specifically, in the figures, the reference 181 denotes a member in the fixed side and the reference 182 denotes a member in the movable side. The member 182 in the movable side is supported to be rotatable on the member 181 in the fixed side, for example, by a pivot bearing 183. A damping material holding gap G is formed between the surfaces 184 and 185 of the member 181 in the fixed side and the member 195 in the movable side which are positioned apart from the pivot bearing 183 and are opposed to each other, and a damping material 174 is held in the damping material holding gap G.

Further, a pair of projecting portions 186 are provided to be projected from positions opposed to each other on these surfaces 184 and 185. These projecting portions 186 each have a truncated conical shape as shown in FIG. 18 and the gap between the projecting portions 186 is formed as a narrow portion N. As described above, since these projecting portions 186 each have a truncated conical shape, the narrow portion formed between these portions has a shape whose width is narrowed in all directions. Accordingly, in this narrow portion N, a damping material 174 is held at a predetermined position where the material is stabilized in all directions.

Also, this embodiment uses the pivot bearing 183 as described above, and it is not preferable that this pivot bearing 183 is embedded in the damping material 174. However, in this embodiment, since the damping material holding gap G is provided at a position apart from the pivot bearing 183 and since the pivot bearing 183 is not embedded in the damping material 174, the pivot bearing 183 does not cause an operation error or the like.

Figure 19:
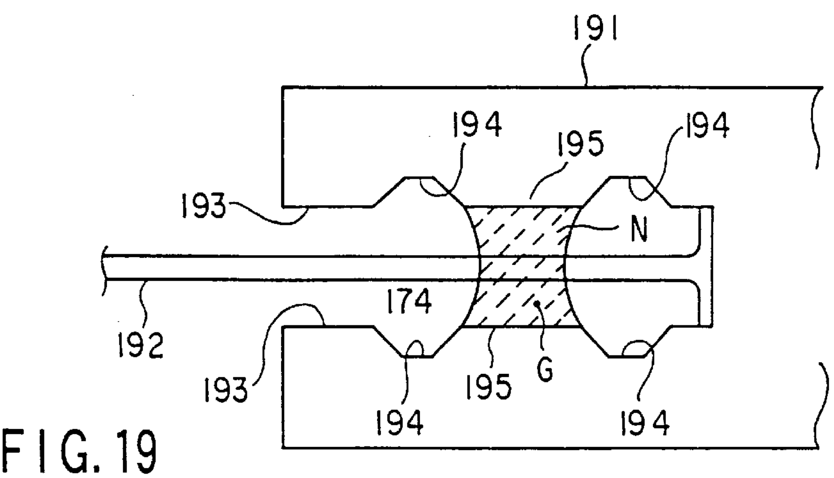
FIG. 19 is a side view of a supporting apparatus according to a sixth embodiment.
Figure 20:
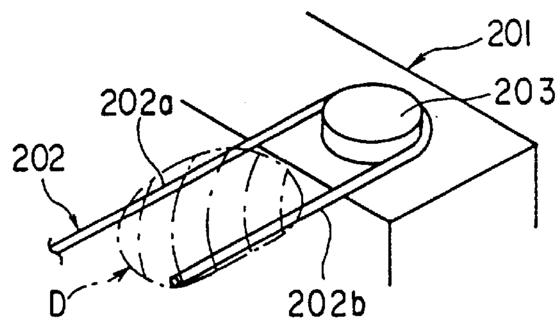
FIG. 20 is a perspective view of a conventional supporting apparatus.
Figure 21A:
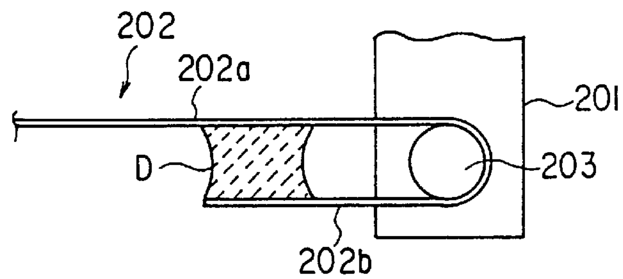
FIGS. 21A, 21B, and 21C are plan views showing respectively different states of a conventional supporting apparatus.
Figure 21B:
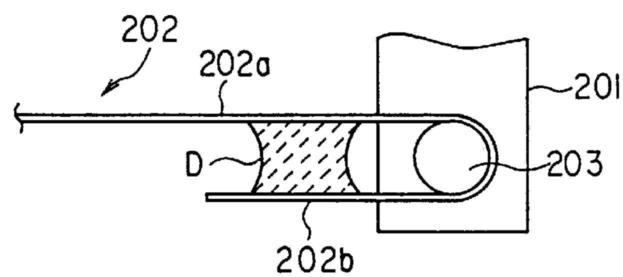
Figure 21C:
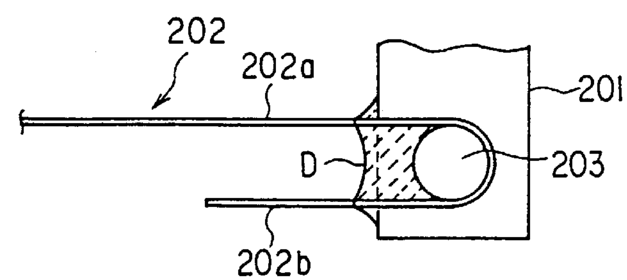

FIG. 19 shows a sixth embodiment of the present invention. The reference 191 in the figure denotes a member 191 in the fixed side, and the member 191 in the fixed side is formed in a substantial U-shape. A damping material holding gap G is formed between a pair of surfaces 193 of the inner surface of the member which are opposed to each other. Further, an end portion of a linear spring portion 192 is inserted in the damping material holding gap G, and the end of the spring portion 192 is attached to a deep portion in the damping material holding gap G. In addition, a member in the movable side (not shown) is attached to the other end portion of the spring portion 192 and is supported to be movable in a predetermined direction or rotatable about a predetermined axis, for example.

On a pair of surfaces 193 forming part of the damping material holding gap G, two pairs of concave portions 194 are formed at a predetermined interval. Therefore, the portions between the concave portions 194 are formed as substantial projecting portions 195, and the portion between the projecting portions 195 is formed as a narrow portion. Further, a damping material 174 is held stably at a predetermined position. In this embodiment, substantial projecting portions 195 are formed between the concave portions 194, and these shapes are called projecting portions in the present specification.

Further, the present invention is not limited to the embodiments described above. For example, the support mechanism for the member in the movable side is not limited to a spring or a pivot bearing as described above as described above, any other arbitrary support mechanism can be adopted. In addition, in those of the above embodiments that use a spring in the support mechanism, a part of the spring which can be deformed is embedded in a damping material thereby to make a damping effect. However, even in a structure using a spring, the structure may be arranged such that the damping material is held at a position where the spring is not embedded, like in the fifth embodiment.

The damping material described above is, for example, thermosetting silicon gel, ultraviolet hardening silicon gel, acrylic gel, butyl rubber liquidized by a solvent, silicon oil, or the like. The silicon oil is used directly in an unhardened state.

Further, the damping material is not limited to the thermosetting silicon gel or the like but an arbitrary material can be used as far as it has fluidity and held by the surface tension when the damping material is held at the damping material holding portion. In addition, the fluidity of the damping material is required only when the damping material is injected and held. When the material is hardened after being injected and held, the fluidity is not necessary.

In addition, the present invention is not limited to an apparatus for supporting a mirror of a galvano mirror as described above but is naturally applicable to an apparatus for movably or rotatably supporting an arbitrary optical element or component, such as a supporting apparatus for an objective lens as disclosed in the Japanese Patent Application KOKI Publication No. 6-314432.

As has been described above, in the supporting apparatus for an optical element or component according to the present invention, the area of the free surface of a damping material changes in a narrow portion when an unhardened damping material injected in a damping holding gap is going to move in the gap. Therefore, movement of the damping material is restricted by the narrow portion, so that the damping material is held at a predetermined position but does not cause variation of the damping force. It is thus possible to provide a supporting apparatus with high accuracy.

Note that a person in the art can add other improvements or modifications hitherto than described above. Therefore, more broadened embodiments of the present invention are not limited to the embodiments described above. Accordingly, various modifications can be made without deviating from the basic subject or concept of the present indicated by the claims.

I claim:

1. A supporting apparatus for an optical element or component, comprising:

a fixed side section;

a movable side section having at least an optical element or component;

a support mechanism for supporting the movable side section such that the movable side section can be displaced with respect to the fixed side section;

drive means for displacing the movable side section; and a damping material provided between the fixed side section and the movable side section and having fluidity and viscosity, thereby to apply a damping force against a displacement of the movable side section, wherein the apparatus further comprises a damping material holding gap for holding the damping material, and the damping material holding gap has a narrow portion where the damping material holding gap is partially narrowed in correspondence with a holding position of the damping material.

2. An apparatus according to claim 1, wherein the narrow portion is formed at a position corresponding to a center portion of the damping material held at a predetermined position.

3. An apparatus according to claim 1, wherein the narrow portion is formed at a position corresponding to an end portion of the damping material held at a predetermined position.

4. An apparatus according to claim 1, wherein the narrow portion is formed at each of a plurality of portions.

5. An apparatus according to claim 1, wherein the damping material holding gap is formed between at least two surfaces, one being a surface formed on the fixed side section and another being a surface formed on the movable side section, the support mechanism comprises a spring for supporting the movable side section such that the movable side section can be displaced by elastic deformation, and at least a part of the spring is arranged in the damping material holding gap and is embedded in the damping material held in the damping material holding gap.

6. An apparatus according to claim 1, wherein the damping material holding gap is formed between at least two surfaces formed on the fixed side section and at least two surfaces formed on the movable side section, the support mechanism comprises a spring for supporting the movable side section such that the movable side section can be displaced by elastic deformation, and at least a part of the spring is arranged in the damping material holding gap and is embedded in the damping material held in the damping material holding gap.

7. An apparatus according to claim 1, wherein the support mechanism comprises a spring for supporting the movable side section such that the movable side section can be displaced by elastic deformation, and the damping material holding gap is formed at least two portions of the spring which are displaced relatively to each other when the spring is elastically deformed.

8. An apparatus according to claim 1, wherein the damping material holding gap is formed between at least two surfaces, one being a surface of the fixed side section and another being a surface of the movable side section, and the support mechanism is provided outside the damping material holding gap.

9. An apparatus according to claim 5 or 6, wherein the narrow portion is formed of a projecting portion formed on at least one of the two surfaces or the spring.

10. An apparatus according to claim 7, wherein the narrow portion is formed of a projecting portion provided to be projected from a part of the spring.

11. An apparatus according to claim 6, wherein the narrow portion is formed of a projecting portion formed on at least one of the two surfaces or the spring.

* * * * *